(12) United States Patent
Allis

(10) Patent No.: US 8,065,975 B2
(45) Date of Patent: Nov. 29, 2011

(54) TEMPERATURE MEASURING, ALGAE CLEANING AND FEEDING SYSTEMS FOR AQUARIUMS

(75) Inventor: Anthony Allis, Bronx, NY (US)

(73) Assignee: Mag-Life LLC, Scarsdale, NY (US)

( * ) Notice: Subject to any disclaimer, the term of this patent is extended or adjusted under 35 U.S.C. 154(b) by 169 days.

(21) Appl. No.: 12/502,481

(22) Filed: Jul. 14, 2009

(65) Prior Publication Data

US 2010/0116217 A1      May 13, 2010

Related U.S. Application Data

(60) Provisional application No. 61/080,734, filed on Jul. 15, 2008.

(51) Int. Cl.
*A01K 63/04* (2006.01)
(52) U.S. Cl. .......................................... 119/264
(58) Field of Classification Search .................. 119/264, 119/269, 245, 247, 200, 230
See application file for complete search history.

(56) References Cited

U.S. PATENT DOCUMENTS

| | | | |
|---|---|---|---|
| 3,208,090 A * | 9/1965 | Roesel, Jr. .................... 15/220.2 |
| 4,528,940 A * | 7/1985 | Litzburg ........................ 119/248 |
| 5,304,003 A * | 4/1994 | Winninger ..................... 374/150 |
| 5,482,373 A * | 1/1996 | Hutchinson ................... 374/141 |
| 5,515,570 A * | 5/1996 | Muscroft ...................... 15/220.2 |
| 5,778,824 A * | 7/1998 | Musgrave et al. ............. 119/230 |
| 5,988,109 A * | 11/1999 | Rofen ........................... 119/245 |
| 6,206,978 B1* | 3/2001 | Tsui ................................. 134/8 |
| D466,259 S * | 11/2002 | Wang ............................ D32/35 |
| 7,232,519 B2* | 6/2007 | Bluteau ..................... 210/167.21 |
| 7,699,277 B2* | 4/2010 | Bagnall ..................... 248/206.5 |
| 7,784,428 B2* | 8/2010 | Deng ............................. 119/264 |
| 2004/0031118 A1* | 2/2004 | Hanson ........................ 15/220.2 |
| 2009/0211533 A1* | 8/2009 | Sprung ......................... 119/264 |

* cited by examiner

*Primary Examiner* — Yvonne R. Abbott
(74) *Attorney, Agent, or Firm* — Ostrolenk Faber LLP

(57) ABSTRACT

A temperature measuring, algae cleaning and feeding system which includes a thermometer mounted on one side of a first support. At least one first magnet is mounted on an opposite side of the first support. The opposite side of the first support is adapted to engage the outer surface of a first wall of the aquarium. At least one second magnet is mounted on one side of the second support. A scrub pad for removing algae is mounted on the opposite side of the second support, the opposite side of the second support being adapted to engage the inner surface of the first wall of the aquarium opposite the first support such that the first and second magnets attract each other to thereby attach the first and second supports to the first wall of the aquarium. A fish feeding dispenser is mounted on the opposite side of the second support.

21 Claims, 6 Drawing Sheets

TEMPERATURE MEASURING, ALGAE CLEANING AND FEEDING SYSTEMS FOR AQUARIUMS

CROSS-REFERENCE TO RELATED APPLICATIONS

This application is based on and claims the benefit of U.S. Provisional Application No. 61/080,734, entitled "AQUARIUM THERMOMETER, INTEGRATED FOOD CLIP AND SCRUB PAD AND ADVANCED FEEDING SYSTEM," the entire disclosure of which is incorporated by reference herein.

BACKGROUND OF THE INVENTION

The present invention relates generally to aquariums and, more particularly, to temperature measuring, algae cleaning and feeding systems for aquariums.

Among the most important factors in proper maintenance of aquariums is proper monitoring and control of tank temperature; cleaning of the tank, particularly cleaning of the tank to remove algae; and proper feeding of the fish. Control of temperature is important because fish are cold-blooded creatures, they cannot create their own body temperature, and therefore the water around them will give their body heat to maintain a correct metabolism. Fish originate from all corners of the globe, in different parts of the world the fish will live in different temperature scales. They can tolerate a slight variance from the natural water temperature, but beyond that the fish will start to suffer which in turn will induce stress in the fish; this can then lead to fatalities in the aquarium as the fishes immune system will start to break down and bacterial infections can start to attack the fish There are a number of ways to control algae: 1) changing about 10% of the water each week; 2) use algae eating fish or snails; 3) add live plants—plants higher on the evolutionary hierarchy will compete with the algae for nutrients and thus will limit algae growth; 4) limit light; and 5) use of an ultraviolet sterilizer. When all else fails the algae has to be removed by hand. This means scraping the glass with algae scrapers.

Fish foods are engineered to provide a complete and balanced diet for the fish and are available in a variety of forms: floating pellets, sinking pellets, granules, tablets, and flakes.

Flakes are the most common type of processed foods, and are available in a very wide variety. Some flakes are engineered to provide the nutritional requirements of specific varieties or species of fish, and others are designed to counter nutritional imbalances, while still others are balanced to enhance color or growth or to encourage spawning.

Pellets are available in forms that are denser or lighter than water. This allows the fish to feed in a more natural way—if the right pellet is provided. Some fish prefer to feed off the bottom of the tank while others prefer to feed off the surface. Like flakes, pelleted foods are available in many varieties, each with a specific purpose.

Granules are like very small, hard flakes or tiny pellets. Currently only a limited variety of fish food granules are available, usually engineered for the general nutritional needs of small community fish.

Tablets are really just large flat pellets. Most tablets are of a sinking variety, but there are some that are engineered to adhere to the side of the aquarium so that you may observe your fish feeding. Most of the sinking tablets are engineered to provide for the nutritional needs of scavengers and bottom feeders.

The differences in types of food as well the levels in the tank at which different fish swim and feed requires novel approaches to feeding the fish. It is also important that any food delivery system be able to provide a variety of foods. Variety in the diet reduces the chance of any nutritional shortcomings of one or more of the selected foods becoming a health or longevity problem for the fish. Providing a variety of foods will also reduce the chances that fish lose interest in the foods that they are offered.

SUMMARY OF THE INVENTION

It is a general object of the present invention to provide new and improved temperature measuring, algae cleaning and feeding systems for aquariums to provide optimal condition for the inhabitants of the aquariums.

These and other objects of the invention are achieved by a temperature measuring, algae cleaning and feeding system which includes a thermometer mounted on one side of a first support. First magnetic means are mounted on an opposite side of the first support, the opposite side of the first support being adapted to engage the outer surface of a first wall of the aquarium. Second magnetic means are mounted on one side of a second support. A scrub pad for removing algae is mounted on the opposite side of the second support, the opposite side of the second support being adapted to engage the inner surface of a the first wall of the aquarium opposite the first support such that the first and second magnetic means attract each other to thereby attach the first and second supports to the first wall of the aquarium. Means for receiving fish feeding means are mounted on the opposite side of the second support Other aspects, features and advantages of the present invention will become apparent from the following description of the invention which refers to the accompanying drawings.

DETAILED DESCRIPTION OF THE INVENTION

Figure 1:
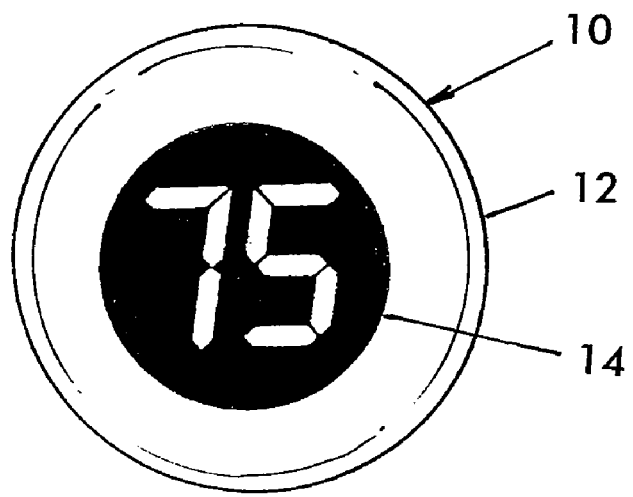
FIG. 1 is a plan view of a thermometer with portions removed for the sake of clarity illustrating certain features of the present invention.

Referring now to the drawings in which like reference characters designate like or corresponding parts throughout the several views, there is shown an embodiment of a temperature measuring, algae cleaning and feeding systems for aquariums illustrating certain features of the present invention.

Referring in particular to FIG. 1, the temperature measuring, algae cleaning and feeding system includes a thermometer 10 with a housing 12 having a digital display 14 on the front (which may be an LCD display) and a conventional temperature sensing and display circuit (not shown) within the housing which includes an analog temperature sensing circuit for sensing the temperature of a spring-loaded sensing element 16, which may be a bimetallic strip (FIG. 2), and an analog to digital converter for converting the sensed temperature to a digital value which may be displayed on the LCD display 14. A switch 18 (FIG. 2) is provided to assure that the circuit is only activated when the thermometer is in use, as will be discussed further below.

Figure 2:
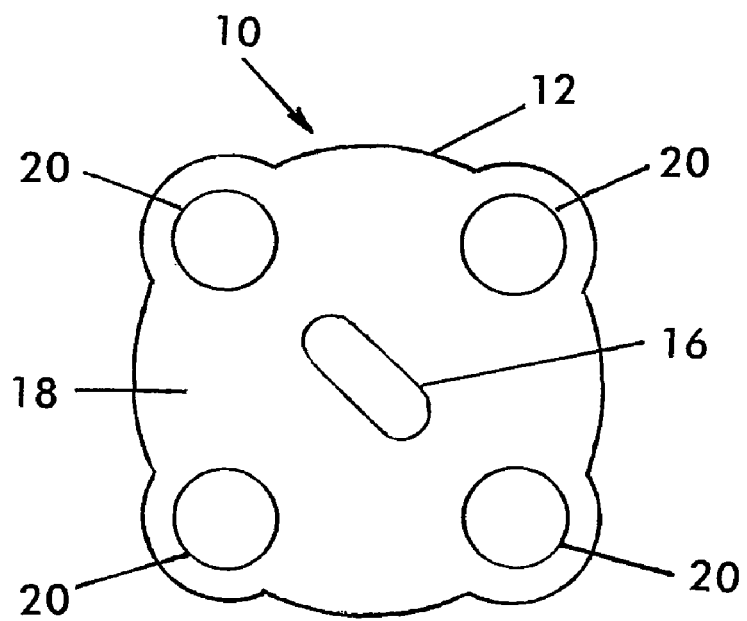
FIG. 2 is a plan view of the back of the thermometer of FIG. 1.

Referring to FIG. 2, which is a view of the back of the thermometer housing 12, the back includes, besides the sensing element 16 and the switch 18, four magnets 20 each of which is located at a corner of the housing.

The LCD 14 provides large display, easy to read from over 25 feet away. This is a big advantage to the current thermometers you need to squint to read. With this easy to see from anywhere display any problem is recognized immediately. Since it is digital, it can also can be simply modified to automatically signal if the temp goes outside of a set safe range.

Figure 3:
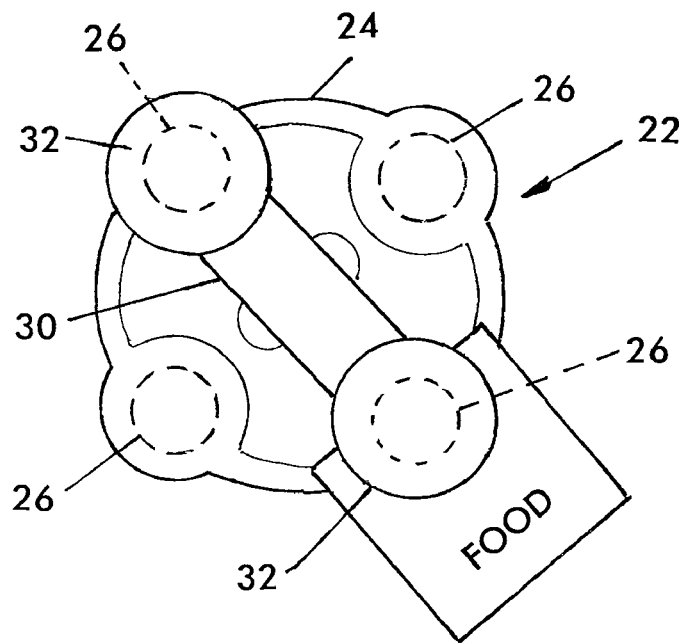
FIG. 3 is a plan view a food clip and scrub pad assembly thermometer illustrating certain features of the present invention.
Figure 4:
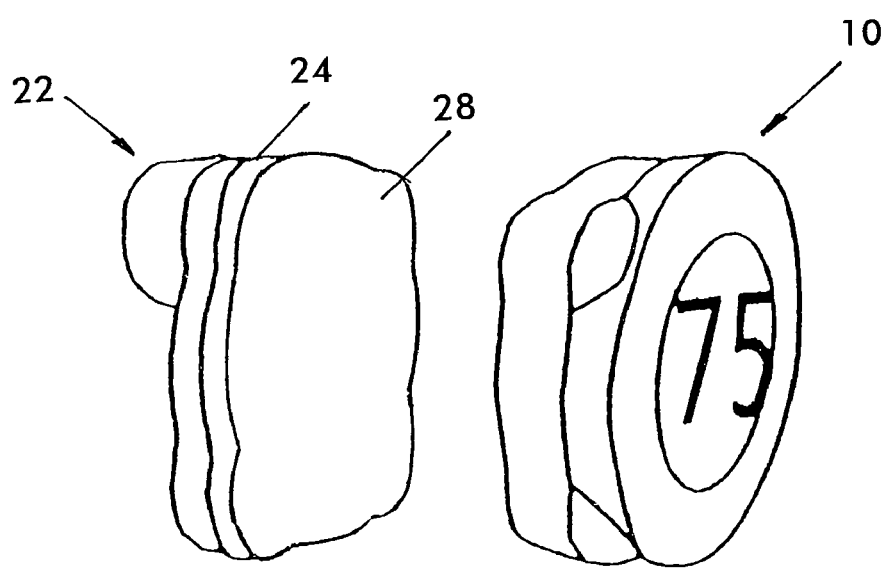
FIG. 4 is a perspective view showing the thermometer and the food clip and scrub pad assembly outside of the aquarium.

Turning now to FIG. 3, there is shown a food clip and scrub pad assembly 22 which includes a housing 24 similarly shaped to the thermometer housing 12 and which also has magnets 26 at each corner arranged to align with a corresponding one of the thermometer magnets 20 when the two housing are positioned as seen in FIG. 4.

One face of the food clip and scrub pad assembly 22 includes a scrub pad 28 and the other face includes a rocker arm clip 30 having magnets 32 at opposite ends of the arm which is arranged to rock between diametrically opposite corners of the food clip and scrub pad assembly 22. When the arm 30 is rocked in one direction, the magnet 32 at the end of the arm portion being moved downwardly engages with the magnet 26 at the corresponding corner of the food clip and scrub pad assembly 22 to firmly hold a sheet of food or fresh foods such as lettuce, feeder fish, shrimp, meats, or any type food affixed by the clip. Conversely when the arm 30 is rocked in the opposite direction, the magnet 32 in the arm portion being moved downwardly will engage with the magnet 26 of food clip and scrub pad assembly which is at the opposite diagonal corner. Since the clip is on the magnetic mount it can be externally raised to the surface and loaded with one hand above the water and lowered externally without putting hands into to the tank.

FIG. 4 shows the thermometer 10 and the food clip and scrub pad assembly 22 side by side outside of the aquarium.

Figure 5:
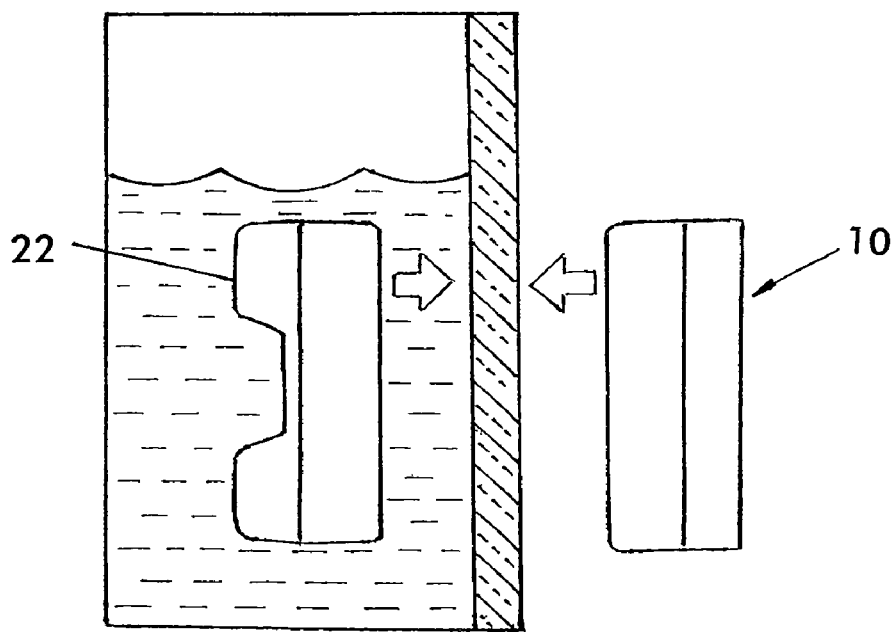
FIG. 5 is perspective view showing the thermometer and the food clip and scrub pad assembly inside of the aquarium prior to being operational aligned.
Figure 6:
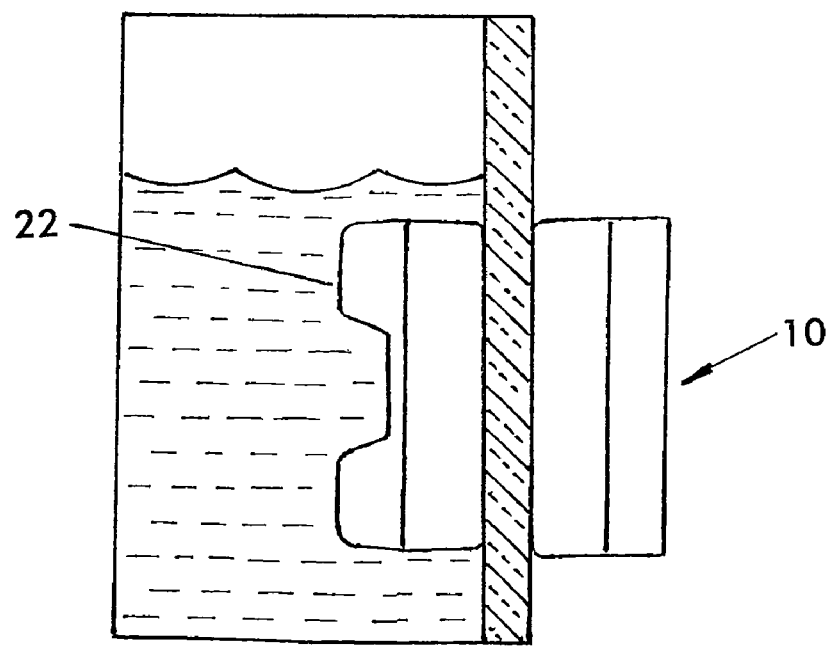
FIG. 6 is a perspective view showing the operational alignment of the thermometer and the food clip and scrub pad assembly inside of the aquarium.

Referring to FIGS. 5 and 6, in operation, the thermometer 10 is placed on the outside of the tank and the food clip and scrub pad assembly 22 is placed on the inside of the tank with the scrub pad 28 facing the back of the thermometer housing 12. Movement of the thermometer housing 12 along the outside of the tank cause corresponding movement of the food clip and scrub pad assembly 22 within the tank, whereby the scrub pad 28 cleans the inside wall of the tank. The magnetic attraction between the food clip and scrub pad assembly 22 and the thermometer housing 12 also assures that the switch 18 on the back of the housing is depressed, whereby the display 14 accurately indicates the temperature within the tank corresponding to the location or the thermometer.

Figure 7:
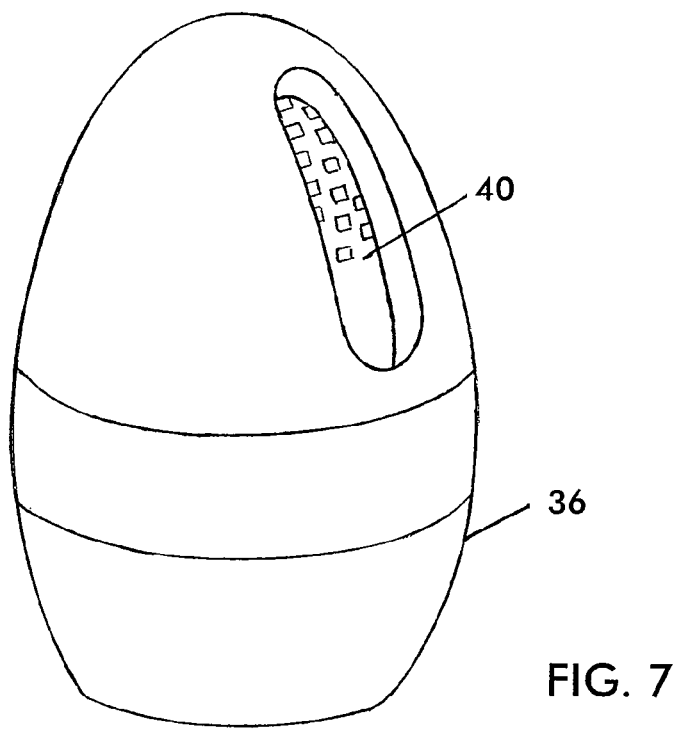
FIGS. 7 and 8 are perspective views of variants of food capsules illustrating certain features of the present invention.

Current methods of feeding fish cause large amounts of food to go uneaten, fouling the tank This advance using food capsules 36 and 38 (FIGS. 7 and 8) is a way to contain the food and release it from an established, known spot from which food is released over time in a large area of the tank where fish have a lot of time to consume it, before it becomes lost and rots instead of nourishing the fish.

Figure 8:
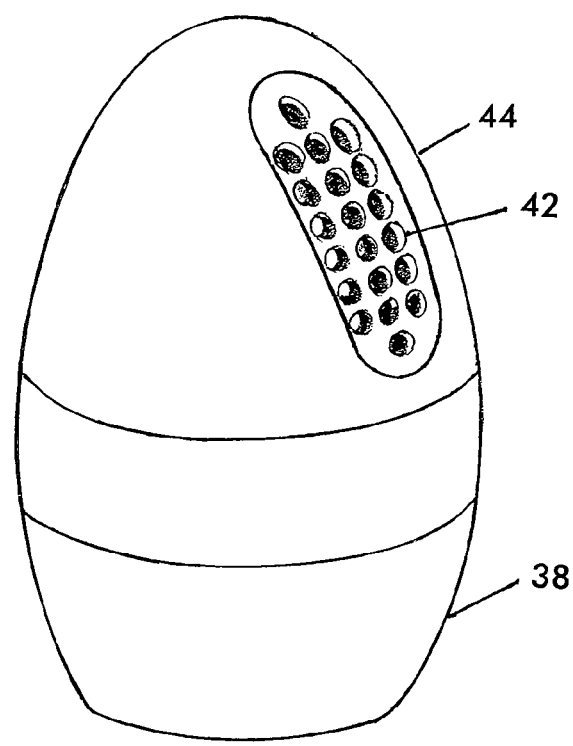

The food capsules 36 and 38 are designed to slowly release the food over time. It can be of any size depending on the number and size of fish. The food capsules accept any size and type food. Capsules may be disposable, containing prepacked frozen or dry food, which get affixed to a magnetic mount. The capsules can have multiple feeding openings 48 that are sealed with pull off tape. Depending on the size and number of fish different size openings can be used or even multiple openings can be open by removing the tape sealing it. While the capsules will slowly release food, fish actually regulate the rate. Fish naturally eat but sucking it in and the capsule acts like a baby bottle from which the fish naturally suck the food out of it. Additionally, as shown in FIG. 8, the capsule 38 may have groups of different size openings 42 and have a rotatable portion 44 which may be rotated to selectively expose a desired group(s) of openings.

Figure 9:
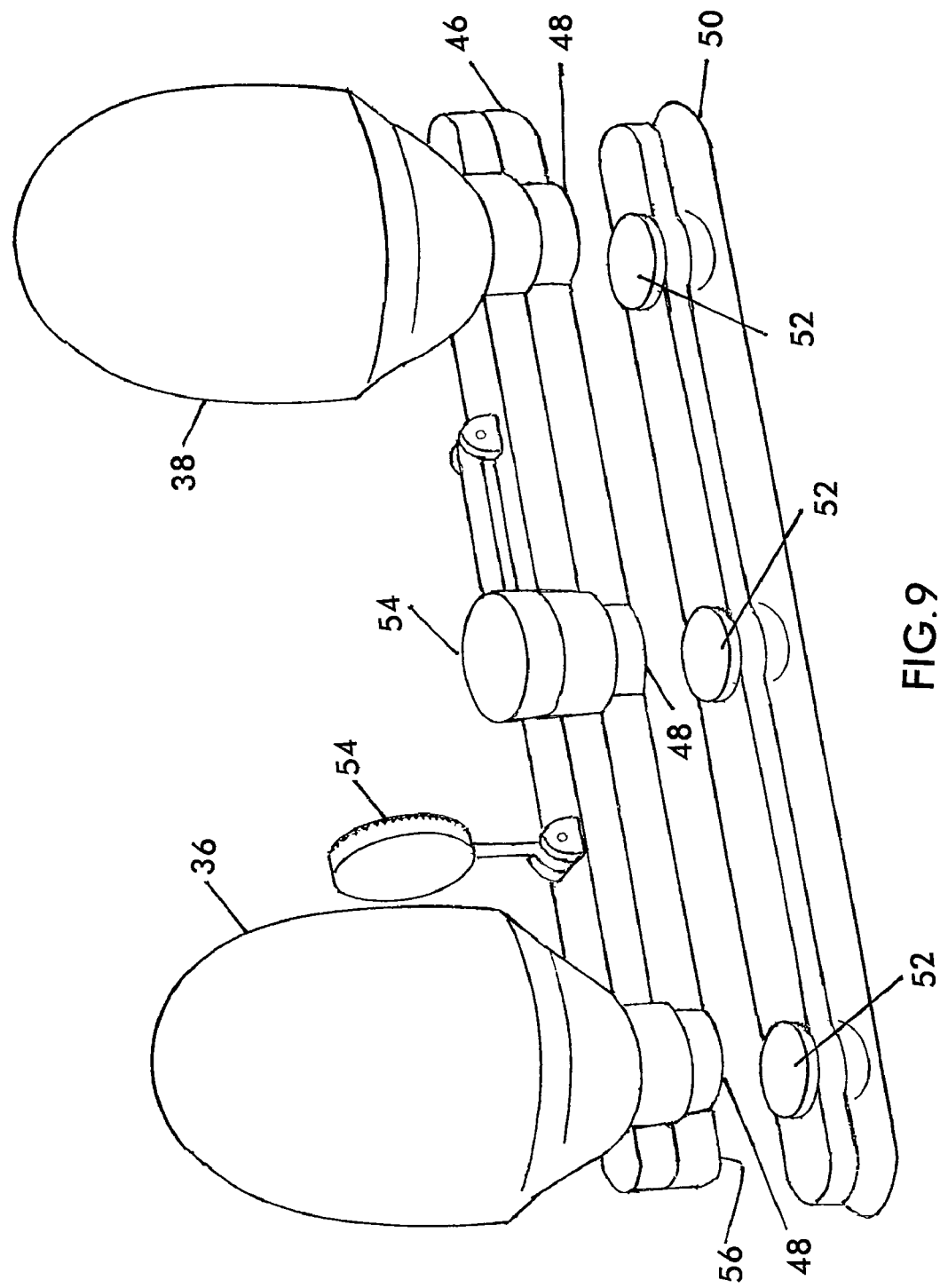
FIG. 9 is a perspective view of an embodiment of a food feeding and scrub pad assembly illustrating certain features of the present invention.

Advantageously, referring to FIG. 9, the food capsules 36, 38 can be mounted on an elongated integrated food clip and scrub pad 46 having a plurality of equally spaced magnets 48. Since the capsules 36, 38 are mounted on the magnet assembly 48 inside the tank, it can be conveniently moved from outside by a similar elongated assembly 50 having a plurality of equally spaced magnets 52. When it is moved, a burst of food is released according to the degree of external movement. It also helps feed the timid fish as you can really control the rate and location food is dispersed in different areas to properly nourish the whole tank. The capsules can also be made to float on the surface and the fish push it around the surface and when they hit it, the movement causes water to flow through it releasing food in response. If they are made heavier than water they can be hung from the top in the open for fish, or with a tiny hole, hung above corals to drop liquid or any type of food appropriate for invertebrates and corals which are nearly impossible to efficiently feed with current methods. The capsules can be additionally mounted using any small external magnet to hold and move the internal capsule.

The feeder is additionally versatile having a pair of seesaw, magnetic clips 54 to hold sheet or fresh foods such as lettuce, feeder fish, shrimp, meats, or any type food affixed by the clip. Since the clip is on the magnetic mount it can be externally raised to the surface and loaded with one hand above the water and lowered externally without putting hands into to tank.

It is additionally versatile as the back of the feeder mount 46 has a glass cleaning pad 56 so that when it is moved it scrubs the glass clean giving it additional utility.

The feeding system gives the versatility to prepare large batches of food at one time. They can then be frozen in the capsules and used whenever needed. Custom blends of fish, lettuce, fresh or purchased foods can be loaded and stored in freezer for convenient availability. Having the food frozen in the ice cubes buffers the release rate. You can simply put a prepared meal into ice cube trays of any size and put a cube into a capsule or you can fill the capsules themselves, they may be disposable or reusable. The disposable capsules affix to a mounting magnetic module then disposed of when empty.

The refillable capsules can contain a mounting magnet built into the base and will affix to the feeder base just by dropping it into the tank near it.

Figure 10:
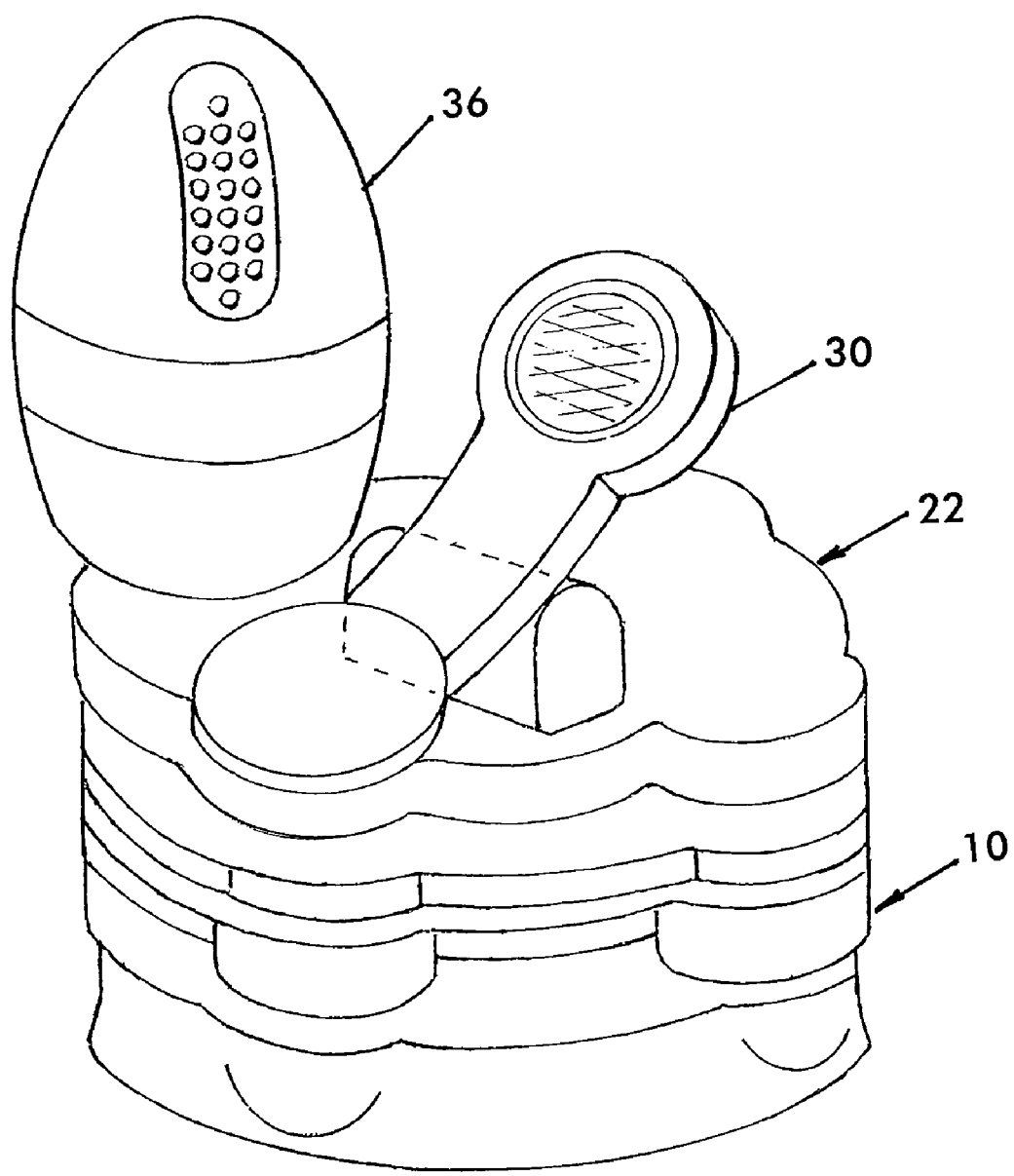
FIG. 10 is a perspective view of temperature measuring, algae cleaning and feeding system illustrating certain features of the present invention.

Additionally, a capsule can be mounted on the food clip and scrub pad associated with a thermometer, as shown in FIG. 10. The four magnets at the four corners gives it greater stability while moving in any direction. Older cleaner magnets operate efficiently on only on axis while this design is stable in any direction.

The term "aquarium" as used herein means any tank, bowl, or other water-filled enclosure in which aquatic animals and/or plants are kept.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A temperature measuring, algae cleaning and feeding system, comprising:
   a first support;
   a thermometer mounted on one side of the first support;
   first magnetic means for producing a first magnetic field mounted on an opposite side of the first support, the opposite side of the first support being adapted to engage the outer surface of a first wall of the aquarium;
   a second support;
   second magnetic means for producing a second magnetic field mounted on one side of the second support;
   a scrub pad for removing algae mounted on the opposite side of the second support, the opposite side of the second support being adapted to engage the inner surface of the first wall of the aquarium opposite the first support such that the first and second magnetic means attract each other to thereby attach the first and second supports to the first wall of the aquarium; and
   fish feeding means mounted on the opposite side of the second support.

2. A system according to claim 1, wherein the first magnetic means includes a plurality of first magnets.

3. A system according to claim 2, wherein the plurality of first magnets are equally spaced from a center of the first support.

4. A system according to claim 1, wherein the second magnetic means includes a plurality of second magnets.

5. A system according to claim 4, wherein the plurality of second magnets are equally spaced from a center of the first support.

6. A system according to claim 1, wherein the fish feeding means includes a clip.

7. A system according to claim 6, wherein the clip is pivotably mounted so as to be pivotable between closed and open positions.

8. A system according to claim 7, wherein the fish feeding means includes a housing for receiving fish food, the housing having a plurality of openings for selectively releasing the fish food.

9. A system according to claim 1, wherein the fish feeding means includes a housing for receiving fish food, the housing having a plurality of openings for selectively releasing the fish food.

10. A temperature measuring and algae cleaning system, comprising:
    a first support;
    a thermometer mounted on one side of the first support;
    first magnetic means for producing a first magnetic field mounted on an opposite side of the first support, the opposite side of the first support being adapted to engage the outer surface of a first wall of the aquarium;
    a second support;
    second magnetic means for producing a second magnetic field mounted on one side of the second support;
    a scrub pad for removing algae mounted on the opposite side of the second support, the opposite side of the second support being adapted to engage the inner surface of the first wall of the aquarium opposite the first support such that the first and second magnetic means attract each other to thereby attach the first and second supports to the first wall of the aquarium.

11. A system according to claim 10, wherein the first magnets are equally spaced from a center of the first support.

12. A system according to claim 10, wherein the second magnetic means includes a plurality of second magnets.

13. A system according to claim 12, wherein the plurality of second magnets are equally spaced from a center of the first support.

14. An algae cleaning and feeding system, comprising:
    a first support;
    first magnetic means for producing a first magnetic field mounted on an opposite side of the first support, the opposite side of the first support being adapted to engage the outer surface of a first wall of the aquarium;
    a second support;
    second magnetic means for producing a second magnetic field mounted on one side of the second support;
    a scrub pad for removing algae mounted on the opposite side of the second support, the opposite side of the second support being adapted to engage the inner surface of the first wall of the aquarium opposite the first support such that the first and second magnetic means attract each other to thereby attach the first and second supports to the first wall of the aquarium; and
    fish feeding means mounted on the opposite side of the second support.

15. A system according to claim 14, wherein the first support is elongated.

16. A system according to claim 15, wherein the first magnetic means includes a plurality of first magnets equally spaced longitudinally along the first support.

17. A system according to claim 14, wherein the second support is elongated.

18. A system according to claim 17, wherein the second magnetic means includes a plurality of second magnets equally spaced longitudinally along the second support.

19. A system according to claim 14, wherein the feeding means includes a clip which is pivotably mounted so as to be pivotable between closed and open positions.

20. A system according to claim 19, wherein the fish feeding means includes a housing for receiving fish food, the housing having a plurality of openings for selectively releasing the fish food.

21. A system according to claim 14, wherein the fish feeding means includes a housing for receiving fish food, the housing having as plurality of openings for selectively releasing the fish food.

* * * * *